United States Patent [19]

Plasko et al.

[11] Patent Number: 5,128,516

[45] Date of Patent: Jul. 7, 1992

[54] HEATING ELEMENT CONTROL

[75] Inventors: Emil R. Plasko, Lexington; James A. Tennant, Perrysville, both of Ohio

[73] Assignee: Therm-O-Disc, Incorporated, Mansfield, Ohio

[21] Appl. No.: 588,001

[22] Filed: Sep. 25, 1990

Related U.S. Application Data

[63] Continuation of Ser. No. 311,768, Feb. 17, 1989, abandoned.

[51] Int. Cl.⁵ .............................................. H05B 1/02
[52] U.S. Cl. .................................. 219/497; 219/505; 219/506; 219/494; 340/584
[58] Field of Search ............... 219/494, 497, 499, 501, 219/504, 505, 506, 509, 507; 340/582, 584

[56] References Cited

U.S. PATENT DOCUMENTS

| | | | |
|---|---|---|---|
| 4,074,719 | 2/1978 | Semm | 219/506 |
| 4,103,275 | 7/1978 | Diehl et al. | 338/28 |
| 4,165,456 | 8/1979 | Dogliotti | 219/452 |
| 4,322,594 | 3/1982 | Brisson | 219/497 |
| 4,518,850 | 5/1985 | Grasso | 219/505 |
| 4,700,051 | 10/1987 | Goessler et al. | 219/464 |
| 4,707,587 | 11/1987 | Greenblatt | 219/299 |
| 4,816,647 | 3/1989 | Payne | 219/464 |

FOREIGN PATENT DOCUMENTS

| | | |
|---|---|---|
| 288915 | 11/1988 | European Pat. Off. . |
| 3049056 | 9/1982 | Fed. Rep. of Germany . |
| 83/00574 | 2/1983 | PCT Int'l Appl. . |

Primary Examiner—Mark H. Paschall
Attorney, Agent, or Firm—Jones, Day, Reavis & Pogue

[57] ABSTRACT

A heating element control includes a ceramic substrate having a resistance circuit thereon of a material having a positive temperature coefficient. A first comparator compares the resistance of the circuit with a first known resistance to control a signal light. A second comparator compares the resistance of the circuit with a second known resistance to control a heating element.

8 Claims, 3 Drawing Sheets

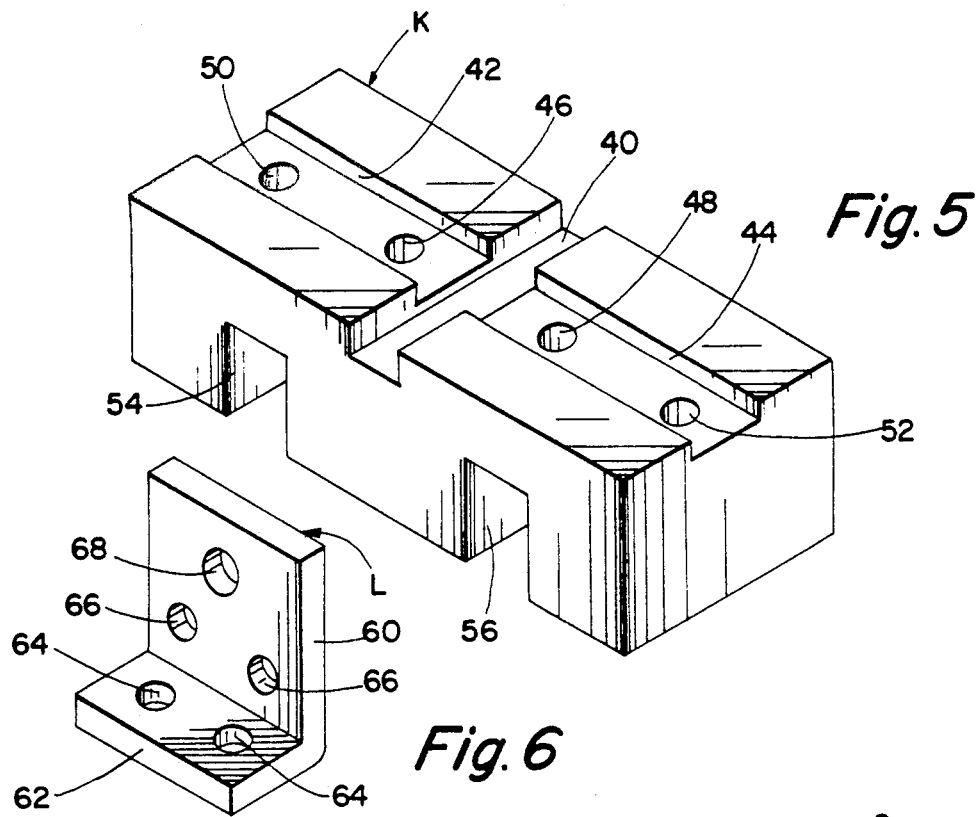
*Fig. 5*
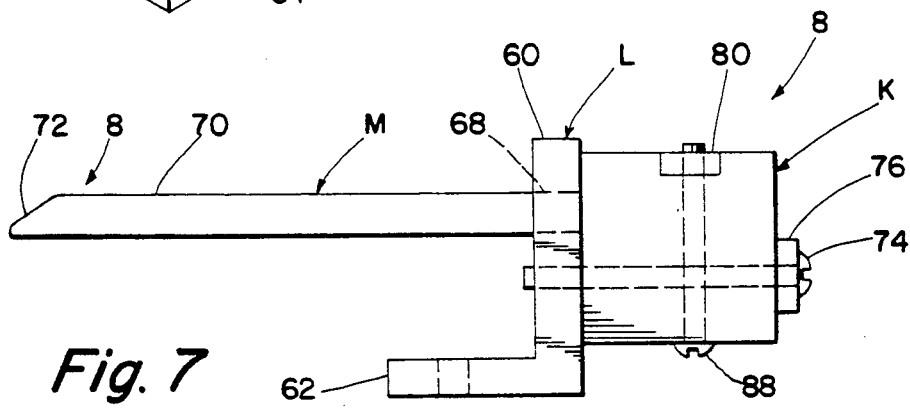
*Fig. 6*
*Fig. 7*
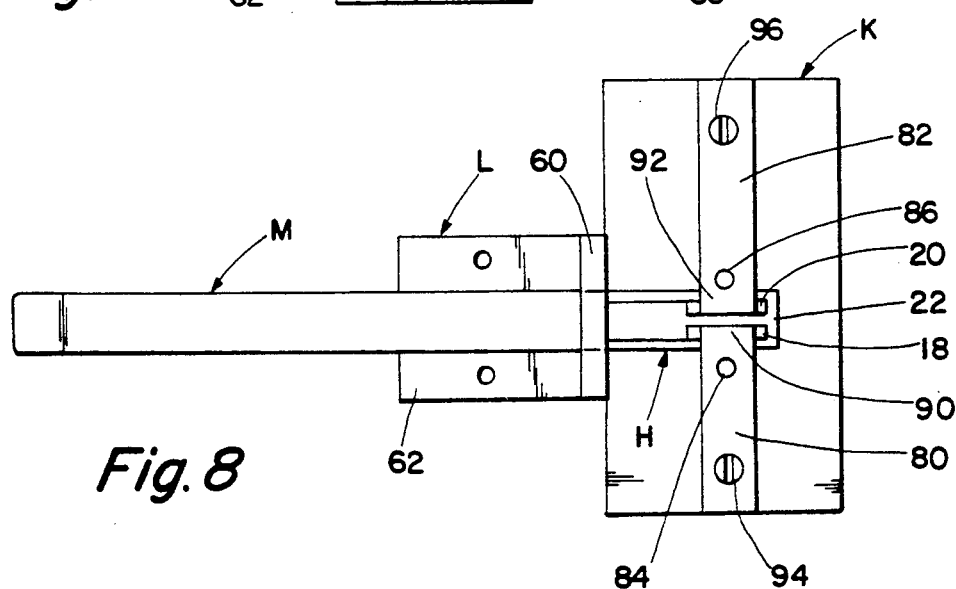
*Fig. 8*

HEATING ELEMENT CONTROL

This is a continuation of application Ser. No. 311,768, filed Feb. 7, 1989, now abandoned.

BACKGROUND OF THE INVENTION

This application relates to the art of controls and, more particularly, to controls for electric heating elements. The invention is particularly applicable for use in controlling heating elements in an electric stove and will be described with specific reference thereto. However, it will be appreciated that the invention has broader aspects, and that the improved control and components thereof can be used for other purposes.

Electro-mechanical control systems for electric heating elements are often difficult to manufacture, fragile to handle and difficult to calibrate. It would be desirable to have an electronic control and an improved temperature sensing probe that did not have the aforementioned drawbacks of electro-mechanical control systems.

SUMMARY OF THE INVENTION

In accordance with the present application, a temperature sensing probe includes an elongated ceramic substrate having a resistance circuit thereon of a material having a positive temperature coefficient. The probe is positionable in proximity to an electric heating element. First comparing means is provided for comparing the resistance of the resistance circuit with a first known resistance to energize a signal light for indicating that a stove cooking surface or the like is hot. Second comparing means is provided for comparing the resistance of the resistance circuit with a second known resistance to control energization of an electric heating element.

In a preferred arrangement, the resistance circuit is a conductive paste that is silk screened onto the ceramic substrate.

The second known resistance with which the resistance circuit is compared may be variable for varying the temperature of the electric heating element being controlled.

The elongated ceramic substrate is positioned in an elongated metal tube with one end portion of the substrate extending from an open end of the tube. The one end portion of the substrate has a pair of pads thereon connected with the resistance circuit and being connectable with terminals on a ceramic mounting block. The one end portion of the ceramic substrate is positioned on a surface of a ceramic block with the pads facing away from the block surface. A pair of terminals are positioned against the ceramic block, and terminal end portions overlie the pads. Fasteners spaced from the ceramic substrate and pads attach the terminals to the ceramic block with the terminal end portions conductively pressed against the pads.

It is a principal object of the present invention to provide an improved control system for electric heating elements.

It is also an object of the invention to provide an improved temperature sensing probe and a manner of connecting terminals to a resistance circuit on the probe.

It is a further object of the invention to provide an improved control for an electric heating element in an electric appliance such as an electric stove.

BRIEF DESCRIPTION OF THE DRAWING

FIG. 5 is a perspective illustration of a ceramic mounting block;

FIG. 6 is a perspective illustration of a probe mounting bracket;

FIG. 7 is a side elevational view showing a temperature sensing probe attached to a mounting bracket and a ceramic block;

FIG. 8 is a plan view taken generally on line 8—8 of FIG. 7; and

DESCRIPTION OF A PREFERRED EMBODIMENT

Figure 1:
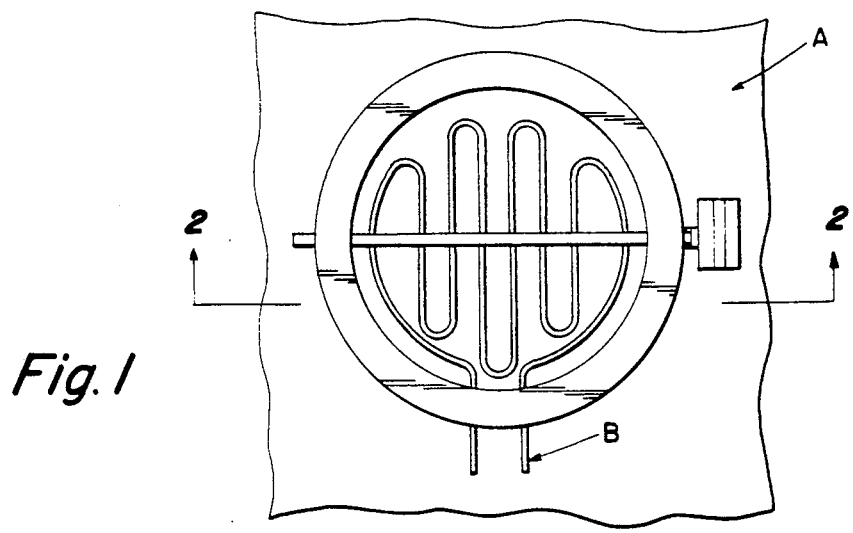
FIG. 1 is a partial plan view of the top of an electric stove.
Figure 2:
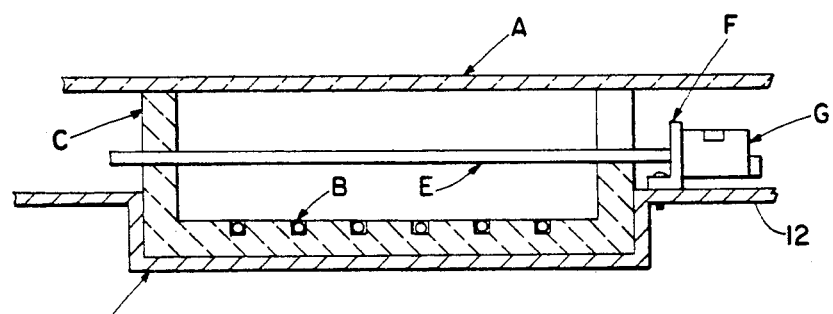
FIG. 2 is a cross-sectional elevational view taken generally on line 2—2 of FIG. 1.

Referring now to the drawings, wherein the showings are for purposes of illustrating a preferred embodiment of the invention only, and not for purposes of limiting same, FIGS. 1 and 2 show a glass top A that provides a cooking surface on an electric stove. A pancake-type of electric heating coil B is mounted to a dielectric support C which in turn is supported by a metal frame D forming part of the stove structure.

An elongated temperature sensing probe E extends completely across coil B intermediate glass top A and coil B. Probe E is preferably positioned substantially closer to glass top A than to heating coil B.

Probe E is attached to a mounting bracket F and a ceramic block G, and the bracket F is secured to a mounting flange 12 on stove structure D.

Figure 3:
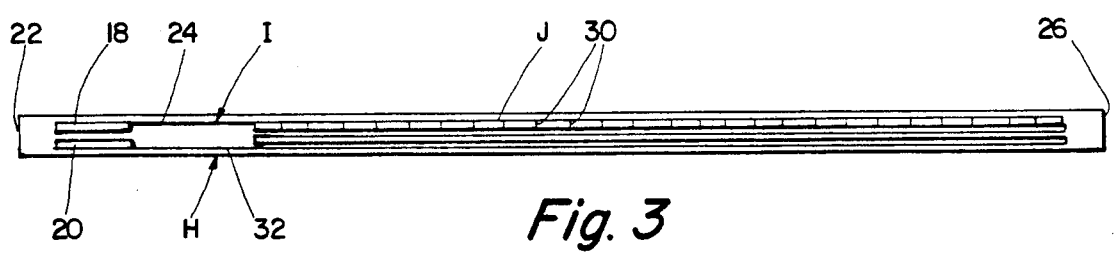
FIG. 3 is a plan view of an elongated ceramic substrate having a resistance circuit thereon.

FIG. 3 shows an elongated flat ceramic substrate H of alumina or the like. A resistance circuit I is provided on a flat surface of ceramic substrate H. Resistance circuit I is preferably of a material having a positive temperature coefficient. That is, the resistance of the material increases with increasing temperature. Although resistance circuit I may be of many different materials, it is preferably a conductive paste that is silk screened onto ceramic substrate H. A particularly useful conductive paste is a mixture of platinum, frit and a solvent. Subsequent to silk screening of the circuit on the substrate, the assembly is fired to fuse the circuit to the substrate.

A pair of relatively large area conductive pads 18, 20 are provided adjacent one end portion 22 of substrate H for connecting the circuit to terminals. The circuit has a lead 24 extending from one pad 18 toward the opposite end 26 of substrate H along a ladder trim portion J of the resistance circuit. All but one of the rungs 30 of the ladder trim are severed as with a laser for trimming the resistance circuit to its desired value. The resistance circuit extends from ladder J back toward one end portion 22, then back toward opposite end 26 and then connects through lead 32 back with pad 20.

Figure 4:
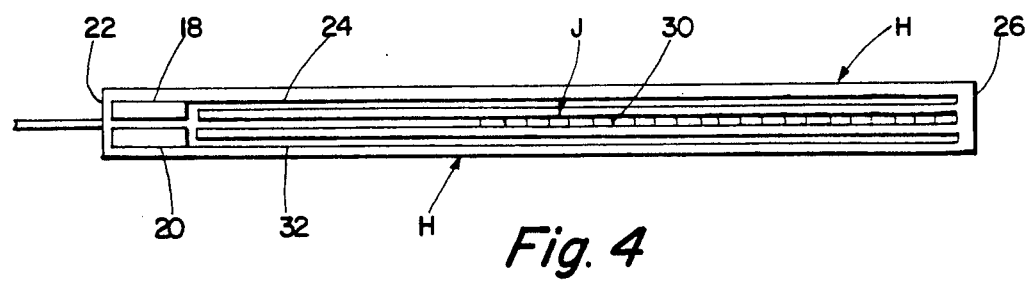
FIG. 4 is a view similar to FIG. 3 and showing a different resistance circuit.

FIG. 4 shows another arrangement wherein ladder trim J is centered on substrate H. The resistance circuit preferably has a resistance of at least 300 ohms at 0° C.

FIG. 5 shows a ceramic block K having a central groove 40 therein intersected by a pair of transverse grooves 42, 44 of shallower depth than groove 40. A pair of fastener receiving holes 46, 48 extend completely through ceramic block K. A pair of bores 50, 52 are provided and do not extend completely through block K. A pair of spaced-apart bottom grooves 54, 56 extend across the bottom of block K outwardly of fastener receiving holes 46, 48.

FIG. 6 shows a generally L-shaped mounting bracket having an upright leg 60 and a horizontal leg 62. A pair of fastener receiving holes 64 are provided in mounting leg 62. A pair of threaded fastener receiving holes 66 are provided in leg 60. An enlarged circular hole 68 in leg 60 is provided for receiving a metal tube of a temperature sensing probe.

FIGS. 7 and 8 show an elongated temperature sensing probe M including an elongated metal tube 70 that receives ceramic substrate H. Tube 70 is pinched closed at one end 72 and the opposite end is open with one end portion 22 of ceramic substrate H extending outwardly therefrom. The open end portion of tube 70 is closely received in hole 68 in mounting bracket 60 and is welded or otherwise suitably secured therein. Fasteners 74 extend through bottom grooves 54, 56 in ceramic block K and are threaded into threaded holes 66 in leg 60 of mounting bracket L for securing the ceramic block and mounting bracket together. Suitable washers 76 may be provided for cooperation with fasteners 74 on the rear surface of block K.

Flat conductive terminals 80, 82 are received in grooves 42, 44 in block K. Each terminal 80, 82 has a threaded hole 84, 86 therethrough for receiving fasteners 88 that extend upwardly through fastener receiving holes 46, 48 in block K. Fasteners 88 securely clamp terminals 80, 82 against the bottom of grooves 42, 44.

Each terminal 80, 82 has an end portion 90, 92 overlying a respective conductive pad 18, 20 on one end portion 22 of ceramic substrate H. Fasteners 88 are completely spaced from substrate H and pads 18, 20, and hold terminal end portions 90, 92 in firm compressive engagement with pads 18, 20. Fasteners 94, 96 extend through threaded holes in terminals 80, 82 and into bores 50, 52 in block K. Wires or connectors are attached with terminals 80, 82 through fasteners 94, 96.

A deformable dielectric material is preferably positioned against the bottom of groove 40 so that end portion 22 of ceramic substrate H rests thereon with pads 18, 20 facing away from the deformable dielectric material and away from the mounting surface on block K. The deformable dielectric material may be a deformable cloth, such as a cloth of polytetrafluoroethylene.

Figure 9:
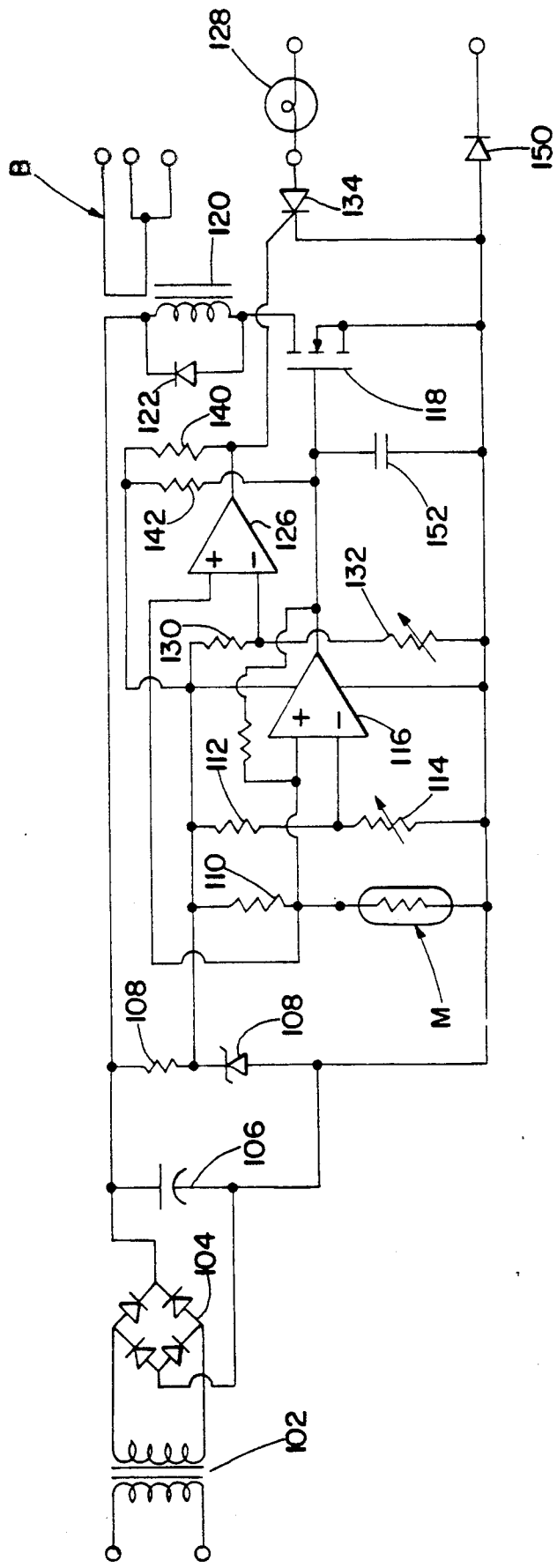
FIG. 9 is a schematic circuit diagram showing a control circuit having the features of the present application incorporated therein.

FIG. 9 is an example of one control circuit that can be employed for carrying out the principals of the present application. A step down transformer transforms 120 volts AC to 24 volts AC. An AC to DC converter is provided by rectifier 104 and capacitor 106. A zener diode 108 regulates the DC voltage and provides a known reference voltage value to work with. A 330 ohm resistor 108 provides circuit protection.

Temperature sensing probe M is connected in circuit with a 1.5K current limiter resistor and voltage divider 110. The voltage goes up and down with varying temperature.

Another 1.5K resistor 112 provides a voltage reference that does not change with temperature. Resistor 112 is connected with a variable resistance 114 with which the resistance of the resistance circuit on probe M is compared.

An operational amplifier 116 provides a comparing means for comparing V1 between resistor 110 and probe M with V2 between resistor 112 and resistor 114. When V1 equals V2, the output of amplifier 116 goes high (to 15 volts), and mosfet 118 is gated on. This energizes relay coil 120 for opening contacts to de-energize electric resistance heater B. A freewheel diode 122 in parallel with relay coil 120 absorbs inductive spikes when the circuit is open for protecting mosfet 118 and also keeps the relay from chattering.

Another operational amplifier 126 provides a comparing means for controlling a hot light 128. A 3K resistor 130 is connected with a variable 200 ohm resistance 132 to set up a reference point for comparing means 126. The voltage across probe M is measured, and when that voltage exceeds a certain limit, the output of comparing means 126 goes high (15 volts), and the output gates SCR134 for energizing hot light 128.

A 680 ohm resistor 140 is a pull up resistor for comparing means 126. Fifty K (50K) resistor 142 is a pull up resistor for comparing means 116. Each comparing means 116, 126 has an internal transistor connected to ground such that when the comparing means output needs to go low, the transistor turns on and the output of the comparator is connected through the transistor to ground. Pull up resistors 140, 142 help perform this function.

There is no transistor to the positive supply in the comparing means so there is no pull in when the comparing means need to go high. External resistors are provided on the comparing means from their outputs to the positive supply. The value of the resistances are chosen so that when there is a load on the comparing means with the internal transistor off, and the output is intended to go high, the voltage across the resistor is small enough that the voltage is pulled high when it becomes close to the supply voltage.

Diode 150 insures that there is no ground loop on the AC. In other words, it is an AC isolator for the DC supply. Capacitor 152 keeps voltage noise off from the gate of mosfet 118. Terminals 80, 82 of FIG. 8 are provided for connecting the circuit of FIG. 9 with probe M.

In the arrangement of the present application, controls for multiple cooking elements can be accommodated on a single circuit board and located at any practical place in or near the cooking stove where the environment may be less hostile to the circuit components.

Operational amplifier 126 defines a first comparing means for comparing the resistance of the resistance circuit on probe M with known resistance 132 for controlling hot light 128. Operational amplifier 116 defines a second comparing means for comparing the resistance of the resistance circuit on probe M with known resistance 114 for controlling electric heater B.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

We claim:

1. A control system for an electric heating element that supplies heat to a body spaced from the heating element, said control system controlling energization of the heating element to thereby control and regulate the temperature of the body that is heated by the heating element, said control system comprising an elongated ceramic substrate having a flat surface thereon, a resistance circuit on said surface, said ceramic substrate and said resistance circuit being physically independent of both the heating element and the body that is heated by the heating element, said circuit being electrically independent of said ceramic substrate such that said ceramic substrate is not part of said circuit, said circuit being of a material having a positive temperature coefficient so that its electric resistance increases with increasing temperature, first comparing means for comparing the resistance of said circuit with a first known resistance to energize a signal light, and second comparing means for comparing the resistance of said circuit with a second known resistance to control energization of an electric heating element.

2. The control system of claim 1 wherein said resistance circuit is a conductive paste.

3. The control system of claim 1 wherein said resistance circuit has a resistance of at least 300 ohms at 0° C.

4. The control system of claim 1 wherein at least said second known resistance is adjustable.

5. The control system of claim 1 including a metal tube receiving said ceramic substrate and having a closed end and an open end, said resistance circuit including pads adjacent one end of said substrate, said one end of said substrate extending out of said open end of said tube, and ceramic mounting block means attached to said tube and substrate.

6. The control system of claim 1 wherein said resistive circuit is made of a platinum filled paste fused to said substrate.

7. In a heating appliance having a glass top and a pancake-type of electrical heating coil spaced below said top for heating same, a temperature sensing probe extending across said coil between said glass top and said coil, said probe including a ceramic substrate having a resistance circuit thereon of a material having a positive temperature coefficient so that its electrical resistance increases with increasing temperature, said probe being physically independent of both said heating coil and said glass top, said resistance circuit being electrically independent of said glass top and said ceramic substrate such that said glass top and said ceramic substrate are not part of said circuit, a signal light for indicating when said glass top is hot, and control means responsive to the resistance of said resistance circuit for controlling said signal light and said heating coil.

8. The appliance of claim 6 wherein said control means includes first comparing means for comparing the resistance of said circuit with a first known resistance to control said signal light, and second comparing means for comparing the resistance of said circuit with a second known resistance to control said heating coil.

* * * * *